C. E. VAN AUKEN.
FRICTION CLUTCH.
APPLICATION FILED OCT. 16, 1908.
907,655.  Patented Dec. 22, 1908.
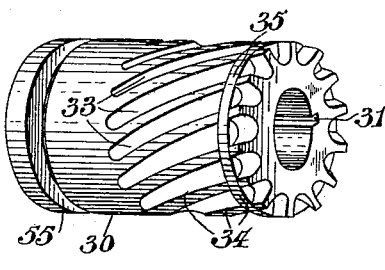
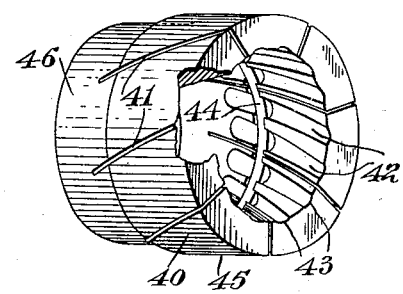
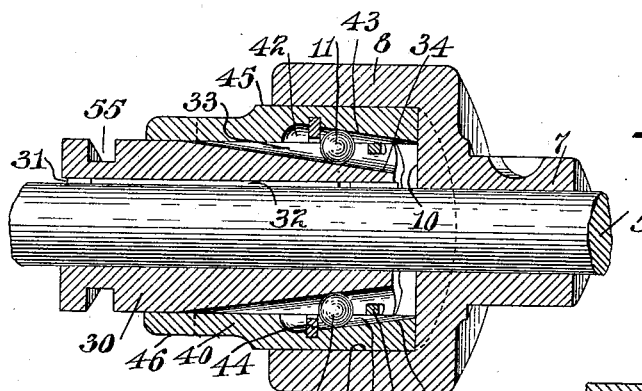
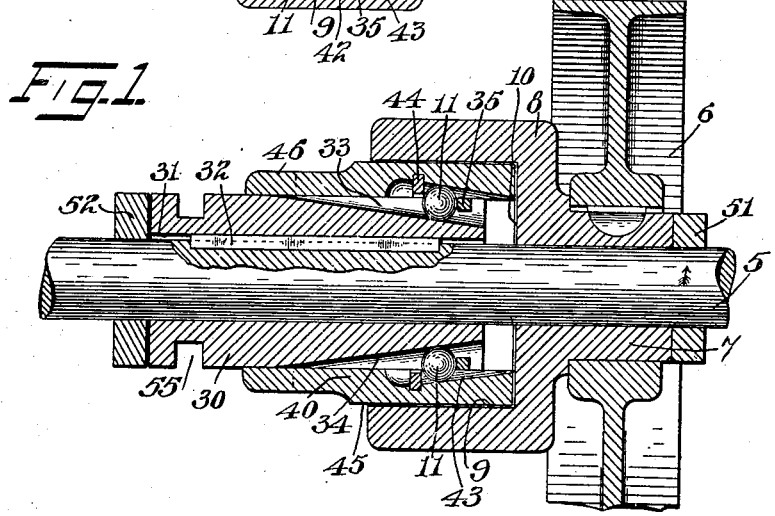
Witnesses.
G. G. Fuss.
H. D. Penney.
Inventor.
Clarence E. Van Auken,
By his Attorney,
F. H. Richards.

UNITED STATES PATENT OFFICE.

CLARENCE E. VAN AUKEN, OF BRIDGEPORT, CONNECTICUT.

FRICTION-CLUTCH.

No. 907,655.      Specification of Letters Patent.      Patented Dec. 22, 1908.

Application filed October 16, 1908. Serial No. 457,991.

*To all whom it may concern:*

Be it known that I, CLARENCE E. VAN AUKEN, a citizen of the United States, residing in Bridgeport, in the county of Fairfield and State of Connecticut, have invented certain new and useful Improvements in Friction-Clutches, of which the following is a specification.

This invention relates to clutches and has for an object to provide improved means for bringing coöperative faces of a clutch into working engagement and for automatically maintaining such clutching engagement.

In a structure embodying this improvement one member of the clutch will be provided with an internal friction face and the other member will be provided with an external friction face carried by members, as for instance fingers elastically yieldable outwardly, each of which fingers upon its inner side will carry one portion of a ball race disposed at an angle to the path of revolution of the fingers, and the other member, which may be rotatable with the driving shaft, will have the other portions of the ball races disposed at an opposite angle. These races will also be disposed at an angle to the axis of their revolution. By means of a ball placed in each of these races the torque of the driving member, which may be the shaft, will effect and maintain the tightening together of the clutch faces. The initial tightening may be produced by a longitudinal movement of the shaft or one of the members thereon. After this initial tightening the members will be held together by the torque upon the parts and will automatically release themselves from clutching engagement upon the cessation of the torque.

In the drawings accompanying and forming a part of this specification, Figure 1 shows a driving shaft in elevation, one element, the passive, of a friction clutch and the pulley in central longitudinal section and the other, or active, element of the friction clutch, comprising two members which are partly in central longitudinal section and partly on a plane at an angle of about forty-five degrees to the axis of the shaft; this view shows the members in uncoupled relation. Fig. 2 is a perspective view of the parts shown in Fig. 1 with the exception of the pulley which is omitted, and shows the parts in coupled relation. Figs. 3 and 4 are perspective views of the members constituting the active element of the clutch.

The friction clutch, a form of which is herein illustrated, provides a quick acting and strong connection between rotary machine parts, and one where the torque produced by the load will operate to maintain an effective frictional engagement between the parts.

In the following detailed description of the present illustration a line shaft at 5, which for convenience will be assumed to be normally in rotation, is the power or driving member upon which is a pulley 6, which pulley at times may be driven from the shaft 5 and at other times may be permitted to remain inactive with relation to the line shaft. The pulley is shown keyed to a hub 7 of one member 8 of the friction clutch, which member is illustrated as the passive member. This member 8 is provided with a chamber, the inner wall 9 of which constitutes a friction face. This wall in the present instance is shown as of cylindrical formation parallel with the axis of rotation of the shaft; this, however, is a detail of construction. The bottom or end face 10 of the chamber in the member 8 constitutes a stop face, the purpose of which will be described.

The active member of the friction clutch embodies a pair of members 30 and 40 respectively. The member 30 is shown provided with a splineway or groove 31 for receiving a spline 32 on the shaft 5. This will permit longitudinal movement of the member 30 while the same is caused to rotate with the shaft. Collars 51 and 52 are mounted upon the shaft to prevent undue longitudinal movement of the hub 7 and of the memb 30. There member 40 is mounted outside of and is free to have a certain amount of longitudinal movement relative to the member 30. The member 30 is provided at a portion of its outer periphery with a series of grooves 33 each of which is disposed at an angle of about forty-five degrees to the path of revolution of the said periphery, and the bottom 34 of each groove inclines at an angle to the axis of said revolution, the latter angle inclines the grooves inwardly toward the end which is directed toward the bottom 10 of the chamber of the member 8; and the former angle directs such end toward the direction of said revolution. The portion of the member 40 which surrounds the splined member 30 is in the form of a number of spring fingers separated by slots 41, which slots extend into the reduced portion 46 of the member 40. The inner perimeter of this member 40, that is the inner face of the fingers, is provided with a series of grooves 42 disposed at an angle to the path of revolution of the fingers and inclined at an angle opposite to that of the grooves upon the member 30; two grooves are shown in each finger. The bottoms 43 of the grooves 42 incline inwardly toward the axis of revolution. The groove bottoms 43 are substantially parallel with the groove bottoms 34. Each of the grooves 33 constitutes one member of a ball race, and each of such ball race members will coöperate with a groove from the series of grooves 42 which comprise mating ball race members. A ball 11 is mounted in each of the raceways formed between the mating grooves 33–42. The balls in the races are prevented from a too great movement by means of rings 44 and 35 carried by suitable grooves in the members 40 and 30 respectively.

The outer perimeter 45 of the member 40 at the portion entering into the spring fingers is illustrated substantially cylindrical affording a friction clutch face for engaging the substantially cylindrical face 9 of the member 8 upon the outward flexing of the fingers carrying such clutch face. The fingers are flexed outwardly upon the movement of the member 30 into the member 40, which will cause the balls to ride up on the faces 34 and 43, thus expanding out the friction face 45. The member 30 has a circumferential groove 55 for receiving an actuator for moving the member 30 longitudinally of the shaft and relatively to the member 40.

The operation of the device is substantially as follows: Assuming that the shaft 5 is rotating in the direction of the arrow and the parts are in the position illustrated in Fig. 1, when it is desired to start the pulley 6 rotating, the member 30 will be shifted toward the right in Fig. 1 and the balls will roll up the inclined faces 34 which constitute the bottoms of the grooves 33 and will be forced down as it were along the bottoms 43 of the grooves 42, which movement of the member 30 will not only cause a slight movement of the member 40 relative to the member 30, but will also expand the clutch face 45 by flexing the fingers outwardly. In such independent movement of the member 40 it will engage the abutment face 10 when its movement will be stopped and the faces 45 and 9 will be brought into clutching frictional engagement. The torque produced by the load upon the pulley will augment the frictional engagement between the clutching faces and will maintain such clutching engagement until the load is taken off or the member 30 is positively moved in a reverse direction, that is toward the left in Fig. 1.

The present improvement may advantageously be used when it is desired to prevent a rotary member, as for instance a shaft, from rotating another part except when such rotary member rotates in the proper direction. It is well known that in certain constructions a shaft may, through inadvertence or perhaps design, be rotated in a reverse direction from the proper driving direction. When the present friction clutch is inserted between such a shaft and a pulley, for instance, the pulley will only be driven when the shaft is rotating in the predetermined forward direction.

Upon the cessation of the torque the parts will have a tendency to separate, the fingers, having been flexed out of their normal position and having a springing tendency to return to such position, will roll the balls in the opposite direction to their friction producing movement as soon as the screwing and thrusting tendency due to the torque is relieved.

Having thus described my invention, I claim:

1. A friction clutch embodying a rotary member provided with a series of spring fingers constituting upon their outer sides a friction clutch face and each finger having on its inner side a member of a ball race disposed at an angle to the path of revolution of said fingers and at an angle to the axis of revolution, of a member having mating ball race members and axially shiftable relative to the fingers, a ball in each of said races, and a member having a friction clutch face surrounding and coöperative with the clutch face upon said fingers.

2. The combination with a rotary member having a friction clutch face concentric with its axis of rotation, of a rotary member shiftable axially relative to said first mentioned member and having a friction clutch face coöperative with the friction clutch face on the said first mentioned member and embodying a series of fingers each provided upon one side with a friction face and upon the other side with an actuator engaging face disposed at an angle to the path of revolution of the clutch face, and an actuator shiftable axially relative to said fingers for engaging said actuator engaging faces and expanding the fingers.

3. The combination with a shaft, of a member splined thereon and provided with spirally disposed ball races slanting inwardly, of an expansible member surrounding the same and provided with ball races disposed in an opposite spiral and similarly slanting inwardly and having upon its outer face a friction surface, a ball in each of said races, and a pulley mounted free upon said shaft and having a friction face surrounding said friction surface.

4. The combination with a shaft, of a member splined to said shaft and having on its perimeter a series of grooves each disposed at an angle of about forty-five degrees to the circumferential line of said perimeter, an expansible member surrounding said splined member and having in its inner perimeter a series of grooves each disposed at an angle opposite in direction to that of the grooves in the splined member, the bottoms of the grooves of at least one of the series being inclined at an angle to the axis of the shaft, said surrounding member having on its outer perimeter a friction face, a pulley, and a member freely mounted upon the shaft and carrying the pulley and provided with an internal friction face coöperative with the said external friction face.

5. The combination with a shaft, of a member mounted on said shaft for longitudinal movement thereon and having in its perimeter a series of grooves, each disposed at an angle to the path of revolution of said perimeter, an expansible member surrounding said longitudinally movable member and having in its inner perimeter a series of grooves each disposed at an angle opposite in direction to that of the grooves in the longitudinally movable member, the bottoms of the grooves of at least one of the series being inclined at an angle to the axis of the shaft, said surrounding member having on its outer perimeter a friction face, a pulley, and a member carrying said pulley mounted upon said shaft and provided with an internal friction face coöperative with the said external friction face.

CLARENCE E. VAN AUKEN.

Witnesses:
CHAS. LYON RUSSELL,
FRED. J. DOLE.